United States Patent [19]

Kirchhoff et al.

[11] Patent Number: 5,085,554
[45] Date of Patent: Feb. 4, 1992

[54] GARBAGE TRUCK

[76] Inventors: Johannes Kirchhoff, Langerfeldstrasse 55,, 5860 Iserlohn; Hans Klossek, Erich-Norrenberg-Strasse 1, both of 5860 Iserlohn,, Fed. Rep. of Germany

[21] Appl. No.: 572,177

[22] Filed: Aug. 23, 1990

[30] Foreign Application Priority Data

Aug. 23, 1989 [DE] Fed. Rep. of Germany ....... 3927867

[51] Int. Cl.$^5$ .............................. B60P 1/64; B65F 9/00
[52] U.S. Cl. ..................................... 414/346; 414/343; 414/491; 414/555
[58] Field of Search ............... 414/340, 343, 345, 346, 414/491, 498, 546, 555

[56] References Cited

U.S. PATENT DOCUMENTS

| | | | |
|---|---|---|---|
| 1,451,127 | 4/1923 | Thornton | 414/343 |
| 3,355,043 | 11/1967 | Talbert | 414/498 X |
| 3,892,323 | 7/1975 | Corompt | 414/491 |
| 3,964,625 | 6/1976 | Wirz | 414/498 X |
| 4,737,063 | 4/1988 | van den Pol | 414/346 |
| 4,755,098 | 7/1988 | Wolf et al. | 414/491 X |
| 4,762,291 | 8/1988 | Sauber | 414/555 X |
| 4,915,567 | 4/1990 | Ellinge | 414/345 |
| 5,000,645 | 3/1991 | Polojärvi | 414/498 X |

FOREIGN PATENT DOCUMENTS

| | | |
|---|---|---|
| 2332849 | 9/1974 | Fed. Rep. of Germany ...... 414/345 |
| 3420058 | 5/1985 | Fed. Rep. of Germany . |
| 3840246 | 4/1990 | Fed. Rep. of Germany . |
| 81830 | 4/1986 | Japan .................... 414/345 |
| 2064470 | 6/1981 | United Kingdom ............... 414/546 |
| 2112756 | 7/1983 | United Kingdom ............... 414/345 |
| 2170184 | 7/1986 | United Kingdom ............... 414/498 |

OTHER PUBLICATIONS

Brochure entitled "Ampliroll" by Whittaker.

Primary Examiner—David A. Bucci
Attorney, Agent, or Firm—Allegretti & Witcoff, Ltd.

[57] ABSTRACT

A garbage-collecting truck provided with replaceable containers is disclosed The truck includes replaceable containers that are adapted to be transferred to a trailer coupled to the truck.

4 Claims, 5 Drawing Sheets

GARBAGE TRUCK

BACKGROUND OF THE INVENTION

This invention relates to a truck for picking up, depositing and transporting containers which are adapted to be coupled to said truck, preferably a garbage-collecting truck provided with replaceable containers, which truck comprises a pivoted frame, which is pivotally movable by a hydraulic-cylinder unit about a transverse axis disposed in the rear portion of the chassis, also comprises a carriage, which is movably mounted on said pivoted frame and reciprocable by a hydraulic piston-cylinder unit and adapted to be coupled to the container by a hook and adapted to displace the container on the pivoted frame.

A known truck of that kind is known from the prior German Patent Application P 38 40 246.7, which is no prior publication. Said known truck permits containers provided on said truck to be deposited without a need for additional lifting tackle and in such a manner that the containers stand upright on their rear side surface and the truck is also adapted to pick up containers which have been deposited in that manner and to effect said picking up without a need for additional transporting and lifting means.

There is also a desire to transfer containers from a loading surface of a truck to a trailer so that the containers can be transported in larger sets to their destinations and to transfer containers from trailers to the loading surface of a truck.

For this reason it is an object of the present invention to provide a truck which is of the kind described first hereinbefore and can be used to deposit transport containers on trailers and to pick up the transport containers from such trailers and to accomplish this without a need for additional transporting means and/or lifting tackle.

In a truck of the kind described first hereinbefore that object is accomplished in accordance with the invention in that means are provided for transferring a container to a trailer that is coupled to the truck and for transferring a container from the trailer to the truck and said means have the following features:

a) The trailer is provided with a trailer carriage, which is movable on the trailer in the longitudinal direction by drive means, and the rear end of the container is adapted to be locked to said carriage when said rear end has been pushed onto said carriage;

b) the pivoted frame is provided with drive means and gearing for pivotally moving said pivoted frame through about 180 degrees.

By means of the truck, a container which is coupled to the pivoted frame of the truck can be deposited on a trailer which is coupled to the truck and said depositing can be accomplished in that the pivoted frame initially rests in a horizontal position on the chassis and the container is displaced rearwardly by means of the carriage to such an extent that the rear end of the container is pushed onto the trailer carriage and is coupled thereto. Thereafter the pivoted frame is erected in known manner through about 90 degrees while the hydraulic piston-cylinder unit for moving the carriage is controlled to be in a floating mode so that relative movements between the carriage and the pivoted frame can be performed without giving rise to constraints and/or without a need for complicated control means. When the pivoted frame has reached an approximately vertical position, the trailer carriage is displaced to pull the rear end of the container as far as to the rear end of the trailer while the drive means for the pivoted frame are controlled to be in a floating mode so that hydraulic drives cannot oppose each other and a gentle deposition of the container on the trailer is ensured. During the last phase of the pivotal movement of the pivoted frame through an angle of 180 degrees the drive means for the pivoted frame, which are in a floating mode, may suitably be throttled so that a hard impact of the container on the trailer will be prevented.

When the container has been deposited on the trailer the pivoted frame is uncoupled from the container in that the carriage retracts the hook out of the eye of the container.

The operation by which a container is picked up from a trailer which is coupled to the truck is performed correspondingly by a reverse operation. At first, the hook provided on the carriage is coupled to the eye of the container and the pivoted frame which has been turned out through 180 degrees is then erected to a vertical position. At that time the drive means for the trailer carriage are controlled to be in a floating mode in order to permit a simple control without a constraint. When the pivoted frame of the truck is vertical that frame is lowered to a horizontal position on the base frame of the chassis, as has basically been described in prior German Patent Application P 38 40 346.7.

The turning of the pivoted frame through 180 degrees from a horizontal position on the base frame of the chassis of the truck may be imparted to the pivoted frame by conventional hydraulic drive means and gearing. Suitable drives include swivel drives, crank drives and gear drives. In accordance with a preferred feature the pivoted frame is adapted to be erected to an approximately vertical position by means of a pivoted lever, which is provided on the pivoted frame and is engaged with a stop provided on the pivoted frame and to which one end of the hydraulic piston-cylinder unit is pivoted. The other end of said unit is pivoted to the chassis, another hydraulic piston-cylinder unit is connected at one end to the pivoted frame and at the other end to the lever in such manner that said other hydraulic piston-cylinder unit imparts to the lever a pivotal movement relative to the pivoted frame so that the pivoted frame, the chassis, the first hydraulic piston-cylinder unit and the lever constitute a four-bar linkage and the pivoted frame is adapted to be turned from its approximately vertical position to a position resulting from a movement through about 180 degrees.

The hook for receiving the eye of the container is suitably pivoted to the carriage and adapted to be locked. The locked position is required, inter alia, to permit a picking up and depositing of a container which stands on its rear side face. A hook which is locked to the carriage is also required for a displacement of the container in its horizontal position on the pivoted frame to a position over the carriage.

In a further embodiment of the invention that part which carries or constitutes the hook consists of a two-armed lever, the other arm of which constitutes a gravity pendulum, which holds the unlocked hook in a vertical position. By that design it will be ensured that when the pivoted frame lies horizontally on the chassis the hook will assume an exactly defined, vertical position in which it can be locked, e.g., by a hydraulically actuated pin, to a carriage which carries said pin so that the pivoted frame can properly perform the required functions as containers are deposited and picked up.

In a second embodiment the object underlying the invention is accomplished in a truck in accordance with the prior art part of claim 1 in that means are provided for transferring a container to a trailer, which is coupled to the truck, or the like and for a transfer of a container from the trailer or the like onto the truck, with the following features:
  a) The trailer or the like is provided with a carriage, which is movable on the trailer in the longitudinal direction by drive means and the rear end of the container which has been pushed onto said carriage is adapted to be locked thereto;
  b) when the carriage has been displaced by a retraction of the piston rod the cylinder of the pressure fluid-operable piston-cylinder unit for displacing the carriage on the pivoted frame is adapted to be shifted to a second pivoted holder so that after the piston rod has been extended the container is displaced further in a substantially horizontal position onto the trailer or the like.

In accordance with the first teaching that end of the container which is locked to the carriage must be lifted by a pivotal movement of the pivoted frame through 180 degrees. The second teaching in accordance with the invention permits the container to be pushed in a substantially horizontal direction onto a trailer, transport truck or rail car. But where the second teaching in accordance with the invention is followed it may be necessary to lift the pivoted frame to such an extent that the fluid-operable piston-cylinder unit with its piston rod in a retracted position can be pivotally moved from its first locked position to its second locked position without an obstruction.

If the second teaching in accordance is followed, the required large transfer displacement will be effected by only one pull-push cylinder in that the cylinder is shifted between two different positions and in said positions is pivotally locked to the pivoted frame. In that case the ports provided for the hydraulic liquid on the fluid-operable piston-cylinder unit must be so arranged and controlled that the cylinder is adapted to perform the pivotal movement through about 180 degrees which is required for its shifting.

In a truck of the kind used in accordance with the invention the second teaching in accordance with the invention may be adopted alone or in addition to the first teaching stated.

The hook for locking the container to the carriage is suitably pivoted to the carriage on a horizontal axis and is adapted to the locked to the carriage by automatically operable locking means. Such locking means may consist of a locking pin, which is adapted to be displaced by a fluid-operable piston-cylinder unit.

In accordance with a further feature of the invention the piston rod is provided at its free end with a crosspiece, which at its center is pivoted to the carriage and at the ends of which the ends of piston rods are movably mounted like cranks whereas the associated cylinders are movably mounted on the carriage on both sides of the cross-piece. The cylinders serve as retaining and damping cylinders for the displacing cylinder so that the latter cannot strike down freely when it has been released from its first swivel mount. Because the piston rods are pivoted like cranks, the displacing cylinder can automatically be pivotally moved from one swivel mount to the other and vise versa.

The hook is suitably double-armed and the piston rod of the fluid-operable piston-cylinder unit for displacing the carriage is pivoted to the lower arm, which is not provided with the hook.

BRIEF DESCRIPTION OF THE DRAWING

Illustrative embodiments of the invention will now be described more in detail with reference to the drawing, in which.

DESCRIPTION OF THE PREFERRED EMBODIMENT

Figure 1:
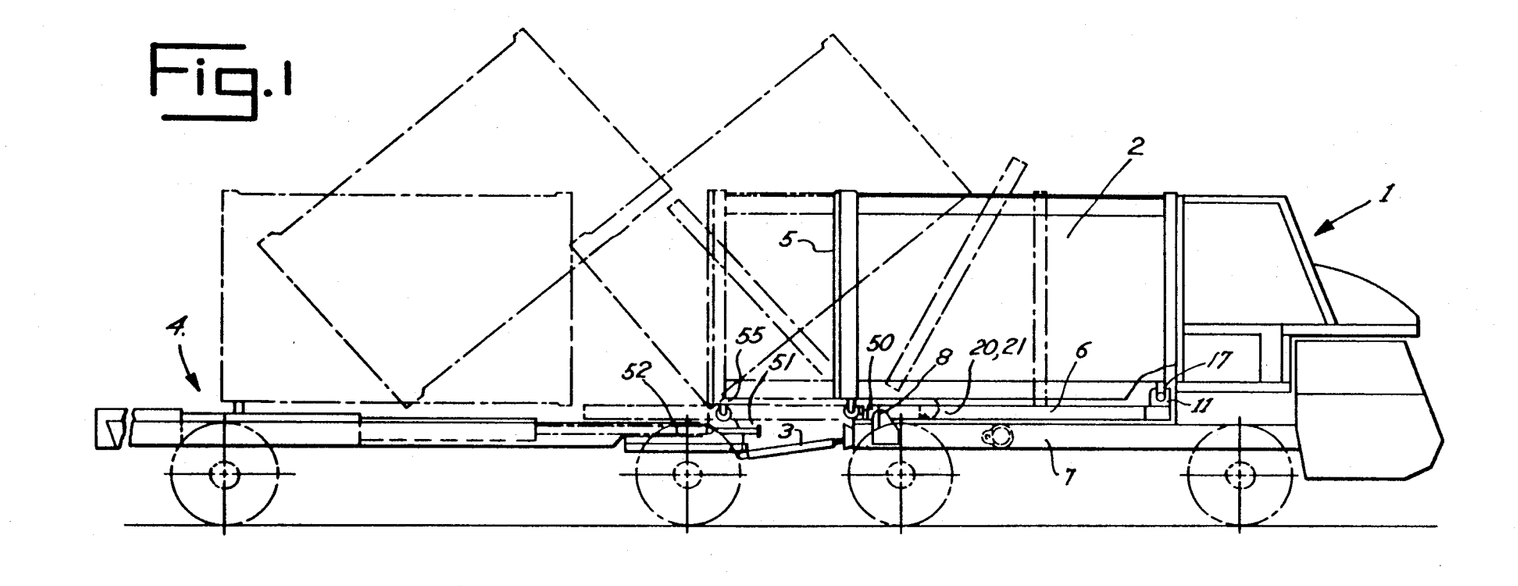
FIG. 1 is a side elevation showing a truck and a trailer which is coupled to the truck. Different positions of the container during its transfer from the truck to the trailer are shown in phantom.
Figure 2:
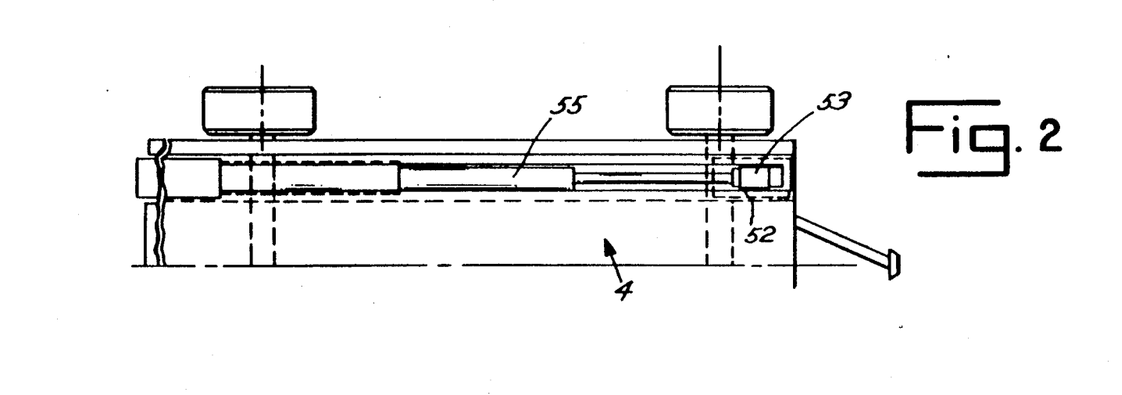
FIG. 2 is a top plan view showing the left-hand half of the trailer with the lifted container.

FIG. 1 shows a garbage-collecting truck 1, which is provided with replaceable containers 2. The trailer 4, to which the replaceable container 2 is to be transferred, is coupled to the garbage-collecting truck 1 by the drawbar 3. The garbage-collecting truck 1 is of a known basic type and has been described in Published German Application 34 20 058, from which further details are apparent.

In the prior German Patent Application P 38 40 246.7, which is no prior publication, it has been described how the parallelepipedic replaceable container 2 can be removed from the collecting truck 1 without a need for extraneous lifting tackle or additional means and can be deposited to stand on its rear side face 5 and can be picked up from that position. A deposition and picking up of replaceable containers may be required, e.g., to replace filled replaceable containers by empty ones so that the collecting operation can be resumed after a replacement.

By the present application, protection is claimed for an improvement of the truck which is known from Published German Applications 34 20 058 and 38 40 246 and which permits replaceable containers which are coupled to the truck to be transferred directly to a trailer.

Figure 3:
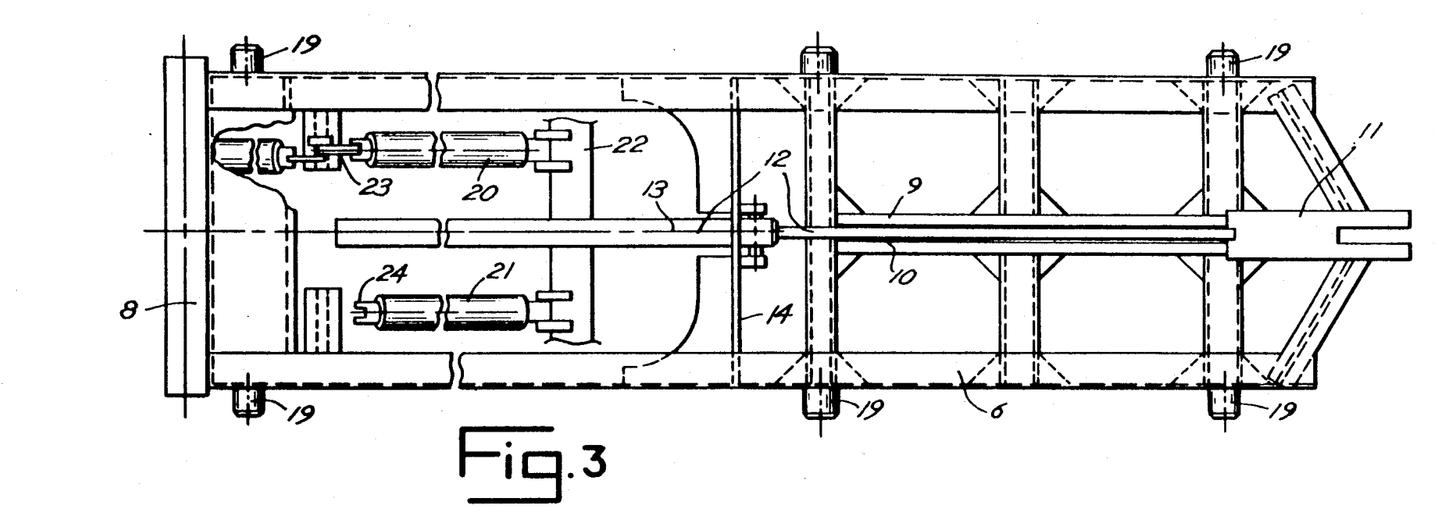
FIG. 3 is a top plan view showing the pivoted frame of the truck and the carriage which is longitudinally movably mounted on said frame.
Figures 6, 7, 8:
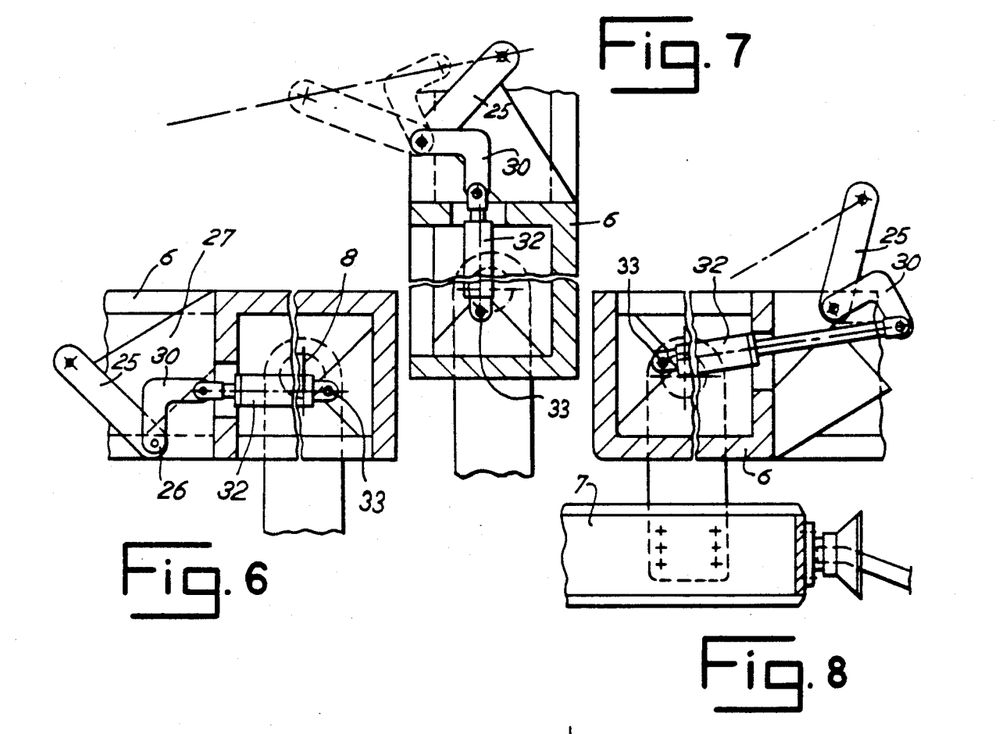
FIG. 6 is a longitudinal sectional view showing that portion of the pivoted frame which is pivoted to the base frame of the chassis; the pivoted frame is shown in its horizontal position on the base frame.
FIG. 7 shows the pivoted frame which has been turned through 90 degrees to a vertical position.
FIG. 8 shows the pivoted frame which has been turned through 180 degrees.

The garbage-collecting truck 1 might be constituted by a different truck and is provided with a pivoted frame 6, which is pivoted on a transverse pivot 8 disposed in the rear portion of the base frame of the chassis of the truck. The pivoted frame 6 is provided with tracks 9, 10, which are apparent from FIG. 3 and on which a carriage 11 is guided, which can be reciprocated by a hydraulic piston-cylinder unit 12. The cylinder 13 of the unit 12 is pivoted to a cross-yoke 14 of the pivoted frame 6 as is shown. The carriage 11 carries a hook 16, into which an eye 17 of the replaceable container 2 can be hung. The replaceable container 2 is provided with lateral skids, which are supported by rollers 19 of the pivoted frame 19. Said rollers 19 are freely rotatably mounted on axle pins mounted on the longitudinal bars of the pivoted frame 6. The pivoted frame 6 can be erected about the pivot 8 by hydraulic piston-cylinder units 20, 21, the cylinders of which are pivoted to a cross-bar 22 of the base frame 7 of the chassis as is shown in FIG. 3. The piston rods 23, 24 of the piston-cylinder units 20, 21 are pivoted to one end of levers 25, which at their other end are non-rotatably connected to the turning shaft 26, which at a distance from the pivot 8 is freely rotatably mounted in the rear portion of the pivoted frame 6 as is apparent from FIG. 6. The levers 25 bear on stops 27 of the pivoted frame 6 so that the pivoted frame 8 can be erected to its vertical position, shown on FIG. 7, in that the piston rods 23, 24 of the piston-cylinder units 20, 21 are extended. The levers 25 bear in such a manner on the engaging surfaces of the abutments 27 that the levers extend at an acute angle to the pivoted frame as is shown in FIG. 6 when the pivoted frame lies horizontally on the chassis.

Bell-crank levers 30 are non-rotatably connected to the turning shaft 26 and at their ends are pivoted to piston rods of piston-cylinder units 32, the cylinders of which are pivoted on the pivots 33 provided in the end portion of the pivoted frame 6.

The replaceable containers 2 should be transferred to the trailer 4 in the orientation that is apparent from FIG. 1. For that purpose the pivoted frame 6 must be turned through about 180 degrees. For that turning through 180 degrees the piston rods 23, 24 of the piston-cylinder units 20, 21 are first extended to erect the pivoted frame 6 through about 90 degrees to the position shown in FIG. 7. The piston rods of the piston-cylinder units 32 are then extended so that the pivoted frame 6 is turned to the rear through further 90 degrees.

The turning movement will now be explained with reference to the generalized sketch in FIG. 9.

Figure 9:
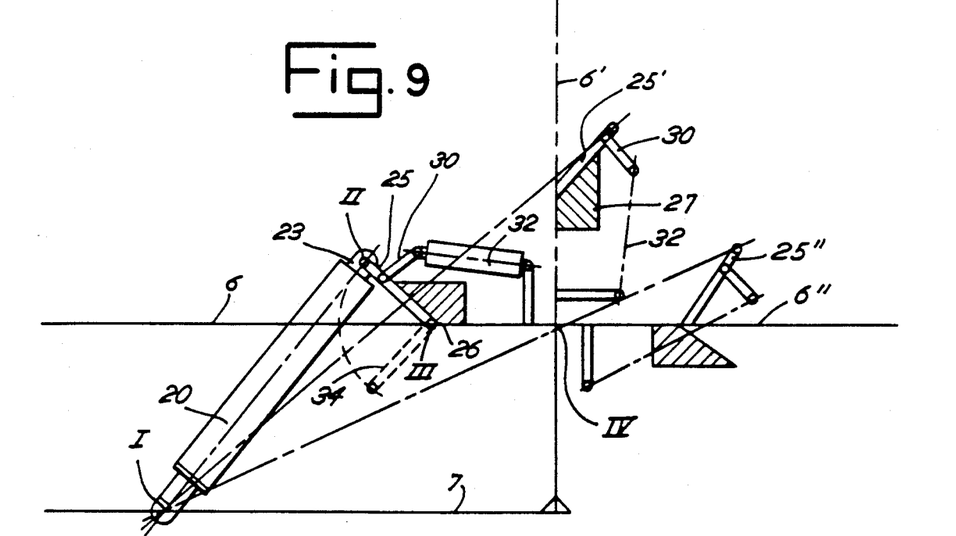
FIG. 9 is a diagrammatic view showing the gearing and drive means for turning the pivoted frame through 180 degrees.

In the left part of FIG. 9 the pivoted frame 6 is shown in the position in which it lies horizontally on the base frame 7 of the chassis. The lever 25, which is pivoted on the pivot 26, bears on an inclined surface of the abutment 27, which is fixed to the pivoted frame 6. The piston rod 23 of the piston-cylinder unit 20 can be extended to erect the pivoted frame 6 to its vertical position shown at 6' in FIG. 7. Before that position has been reached, the piston rod of the piston-cylinder unit 32 remains retracted so that the bell-crank lever 30 holds the lever 25 against the abutment 27.

Approximately when the pivoted frame reaches its vertical position 6' the piston rod of the piston-cylinder unit 32 is extended so that the lever 25 is turned like a crank relative to the pivoted frame 6, which is thus turned to its position 6" reached after a turning through 180°.

The position of the lever 25 after the pivoted frame has been turned through 180° is indicated by broken lines 25" in the left and right parts of FIG. 9. From the left part of FIG. 9 it is apparent that for turning the pivoted frame 6 from its vertical position 6' to the position 6" reached after a turning through 180° the lever 25 turns through about 90°. The turning radius 34 is shown in the left part of FIG. 9.

As is apparent from FIG. 9 the pivoted frame 6, the base frame 7, the piston-cylinder unit 20, 23, and the lever 25 constitute a four-bar linkage having the pivots I to IV. Before the pivoted frame 6 has been erected to its vertical position 6' the pivot III which is constituted by the turning shaft 26 is blocked because the lever 25 is held against the abutment 27. For this reason the pivoted frame 6, the base frame 7 and the hydraulic piston-cylinder unit 20, 23 constitute a three-bar linkage until the pivoted frame has been erected to its vertical position.

During the turning of the pivoted frame 6 from the vertical position to the position 6" reached after a turning through 180° the four-bar linkage I to IV is turned in the manner shown in FIG. 9 in that the piston-cylinder unit 32 imparts a cranklike movement to the turning lever 25 relative to the pivoted frame 6. The cylinder of the piston-cylinder unit 32 must be pivoted to the pivoted frame at such a location that said unit can act on the levers 25, 30 with the most favorable turning moment so that the levers can perform the described cranklike movement with the most favorable turning moment.

Figure 4:
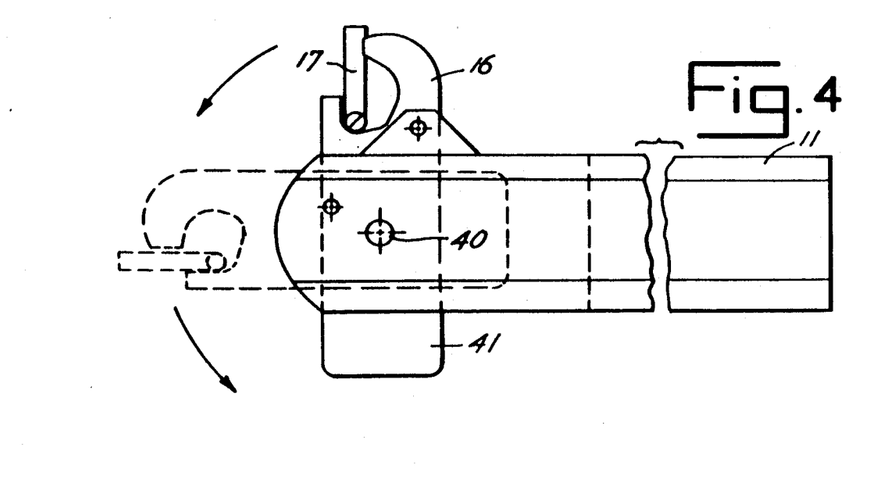
FIG. 4 is a side elevation showing the carriage and a hook, which is pivoted to and adapted to be locked to the carriage.
Figure 5:
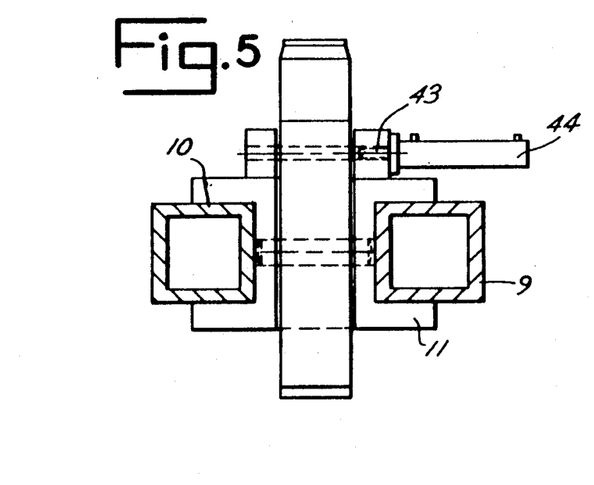
FIG. 5 is a front elevation showing the carrriage on its track.

As is apparent from FIGS. 4 and 5, a two-armed lever is pivoted on the pivot 40 to the carriage 11. The top part of that lever constitutes the hook 16 and the lower arm 41 of that lever constitutes a gravity pendulum, which always holds the hook in its uppermost position. As is apparent from FIG. 5 the carriage 11 is provided with a locking pin 43, which is constituted by the piston rod of the hydraulic piston-cylinder unit 44 and blocks the lever by which the hook 16 is carried in a position in which said lever is at right angles to the carriage 11.

The eye 17 of the container 2 is locked by the hook 16 in the position shown in FIG. 1.

For a transfer of the container 2 to the trailer 4 in the manner shown in FIG. 1, the piston rod of the piston-cylinder unit 13 is retracted so that the carriage 11 is displaced to the rear to the position indicated in phantom so that the rear supporting roller 50 of the container 2 moves on the ramplike inclined surface 51 of a trailer carriage 52, which is movably mounted on the trailer 4. That movement is terminated in that the roller 50 is received by a semicircular depression 53 of the trailer carriage 52. The trailer carriage 52 is movable by a hydraulic-piston-cylinder unit 55 in longitudinal tracks of the trailer 4 but might alternatively be movable by a chain drive or the like.

For a transfer of the container 2 the pivot frame 6 is initially erected to its approximately vertical position while the piston-cylinder unit 12, 13 is in a floating mode so that it will take up the movements of the carriage 11 relative to the pivoted frame 6. Thereafter the trailer carriage 52 is pulled to the rear as is apparent from FIG. 1 while the hydraulic piston-cylinder unit 12, 13 is in a floating mode so that it is pulled along by the carriage 52.

During the remaining depositing movement the pivoted frame is suitably braked so that the container 2 which has been pushed rearwardly onto the trailer is gently deposited on that trailer.

As has been described hereinbefore the depositing of the container 2 on the trailer 4 is initiated in that the container 2, which initially rests on the truck in a horizontal position, is pushed to the rear by the carriage 11 until the supporting roller 50 falls into the receiving depression 53 of the trailer carriage. During that displacement the hook 16 is locked to the carriage 11 by the pin 43 of the piston-cylinder unit 44. After the carriage 11 has been pushed back, the hook 16 is unlocked so that it can swing freely about the pivot 40. That unlocking is permissible because the container is supported in the trailer carriage 52 by the supporting roller 50 so that the container itself does not exert a turning moment on the hook but is merely supported by the hook. During the depositing movement the hook 16 performs a turning movement, which is indicated in FIG. 4 by the arrows and the broken lines showing the hook.

When the container 2 has been deposited on the trailer the hook 16 can be unlocked in that the carriage 11 is retracted.

For picking up a container 2 from a coupled trailer 4 the hook 16 is initially inserted into the eye 17 of the container lying on the trailer so that the hooking is effected.

The second embodiment of the invention will now be described more in detail with reference to FIGS. 10 to 13. Only the differences will be explained. The design and the features of the truck and the pivoted frame will be the same as in the first embodiment in other respects. Identical parts will be designated by the same reference characters as in the first embodiment.

Figure 10:
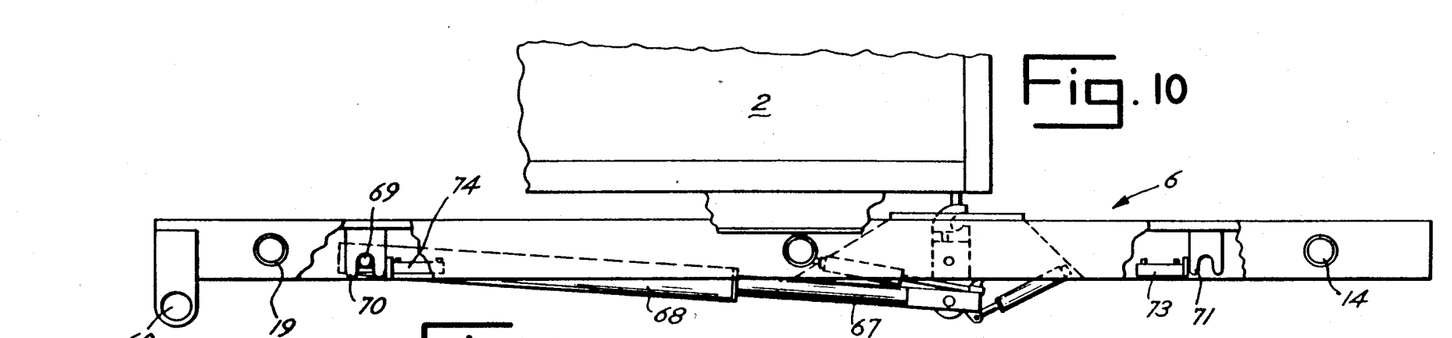
FIG. 10 is a side elevation showing the pivoted frame of a second embodiment with a container, which is slidably mounted on the pivoted frame and can be transferred in a substantially horizontal position.
Figure 11:
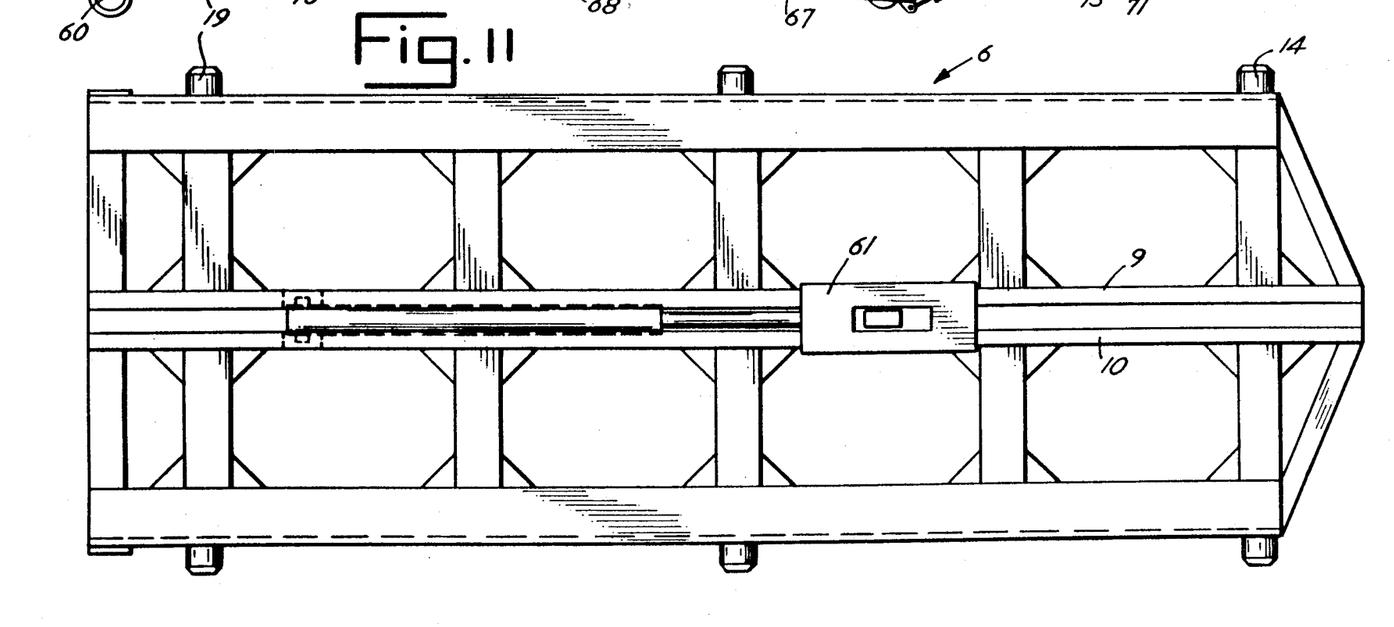
FIG. 11 is a top plan view showing the pivoted frame of FIG. 10 without the container.
Figure 12:
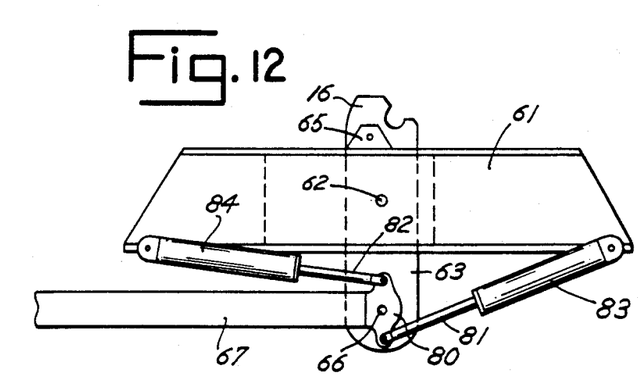
FIG. 12 is a side elevation showing the carriage, which is slidable on and guided by track rails of the pivoted frame.
Figure 13:
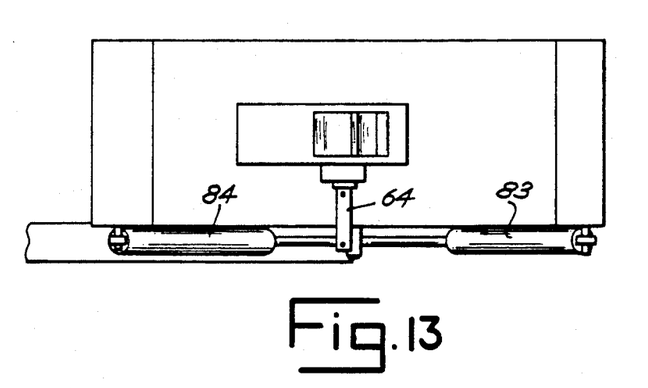
FIG. 13 is a top plan view showing the carriage of FIG. 12.
Figure 14:
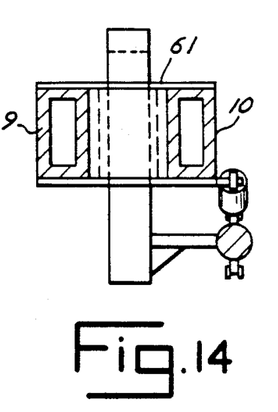
FIG. 14 is a transverse sectional view showing the carriage of FIGS. 12 and 13.

The pivoted frame 6 is pivoted on the pivot 60 in the rear portion of the chassis of the truck and is pivotally movable by a hydraulic-cylinder unit, which is not shown.

A carriage 61 is slidably mounted on the tracks 9, 10 on the pivoted frame 6 and in its middle portion carries a two-armed lever, which is pivoted on a horizontal transverse pivot 62 and the lower arm 63 of which protrudes downwardly beyond the carriage 61. The upper arm consists of or carries the hook 16 and is provided with a bore, which is adapted to receive a pin, which is operable by a hydraulic piston-cylinder unit 64 to lock the hook 16 to the carriage 61. The hydraulic cylinder 64 is flanged to a bracket 65, which is fixed to the carriage.

The depending lower end of the lower arm 63 of the two-armed lever is pivoted by a pivot 66 to the piston rod 67 of a hydraulic piston-cylinder unit, the cylinder 68 of which is provided at its rear end with lateral pivot pins 69, which are adapted to be locket in forked bearing brackets 70, 71, which are provided on the track rails 9, 10.

The locations of the forked bearing brackets 70, 71 are so selected that the cylinder can be pivotally moved into said brackets when the piston rod 67 that is pivoted to the lower lever arm 63 of the locking hook 16 has fully retracted. In that retracted position the sliders by which the pivot pins 69 are locked in the forked bearing brackets 70, 71 can be operated by the associated hydraulic piston-cylinder units 73, 74 to clear the pivot pins 69 so that the pivot pins 69 of the cylinder 68 are pivotally movable into one or the other of the bearing brackets 70, 71.

The forward end of the piston rod 67 of the cylinder 68 carries a cross-piece 80, which has a central transverse bore for movably mounting the cross-piece 80 on the pivot pin 66. The piston rodsd 81, 82 of hydraulic piston-cylinder units 83, 84 are pivoted to the ends of the cross-piece 68. As is apparent from FIGS. 12 and 13 the cylinders of the units 83, 84 are pivoted to the end portions of the carriage 61. The piston rods 81, 82 are pivoted like cranks to the cross-piece 80 so that they can damp the turning movement of the cylinder 68 when it has been released from the bearing brackets 70, 71 and that they can pivotally move the cylinder 68 between its two bearing brackets 70, 71.

The hydraulic ports of the cylinders 68, 83 and 84 are of conventional kind and not shown.

For a transfer of a container 2, which is held on the pivoted frame 6, to a trailer which is coupled to the truck or to a rail car or the like, the piston rod 67 is retracted into the cylinder 68, which is pivoted in the bearing bracket 70. As a result, the carriage 61, to which one end of the container 2 is coupled by the hook 16, is pushed back until the piston rod 67 has been fully retracted. During that rearward movement the container is supported by its skids on the rollers provided on the sides of the pivoted frame.

As soon as the piston rod 67 has been retracted and when the container in a substantial part of its length is still lying on the pivoted frame 6, the locking means 64 are disengaged so that the pivot pins 69 of the pushing and pressure cylinder 68 can move out of the bearings. The cylinders 83, 84 are then operated to turn the cylinder 68 through 180° so that its pivot pins 69 enter the bearing bracket 71 and are then locked therein. The piston rod 67 is then extended again to push the container 2 further onto the trailer or the like. Because the leading end of the container 2 is locked on the trailer carriage, the latter can push the container further onto the trailer for that distance by which the transfer cannot be effected by the piston-cylinder unit 67, 68. As soon as the piston rod 67 has been extended for the transfer, the locking means 64 clear the hook 16 so that the latter disengages the eye of the container as the carriage 61 is retracted.

The same operations are performed in a reverse sequence for picking up a container from a trailer or the like.

In that second embodiment it will be sufficient to turn the pivoted frame 6 through such an angle that the cylinder 68 can be turned freely about the pivot 66 through 180° between the bearings 70, 71.

What is claimed is:

1. A truck for picking up, depositing and transporting containers which are adapted to be coupled to the truck, the truck comprises, in combination,
   a chassis having a rear portion;
   a pivoted frame pivotally connected and movable by a first hydraulic piston-cylinder with about a transverse axis disposed in the rear portion of the chassis;
   a carriage movably mounted to the pivoted frame, the carriage adapted to be moved in a reciprocable fashion by a second hydraulic piston-cylinder unit and adapted to be coupled to a transport container by a hook to displace the transport container on the pivoted frame; and means for transferring the transport container from the truck to the ground or to a trailer connected to the truck, the transferring means comprising a means for pivotally moving the pivoted frame through an arc of 180°.

2. A truck according to claim 1, characterized in that the hook for receiving the transport container is pivoted to the carriage and adapted to be locked to the carriage.

3. A truck according to claim 1, characterized in that the hook comprises a two-armed lever having a gravity pendulum, which holds the hook in an unlocked vertical position.

4. A truck according to claim 1, further characterized in that the pivoted frame is adapted to be erected to an approximately vertical position by a pivoted lever, the pivoted lever being connected to the pivoted frame and engaged with a stop provided on the pivoted frame, the pivoted lever being connected to the first hydraulic piston-cylinder unit at one end, a third hydraulic piston cylinder unit connected at one end to the pivoted frame and at another end to the pivoted lever such that the third hydraulic piston-cylinder unit imparts to the pivoted lever a pivotal movement relative to the pivoted frame so that the pivoted frame, the chassis, the first hydraulic piston-cylinder unit and the pivoted lever constitute a four-bar linkage and the pivoted frame is adapted to turned from an approximately vertical position to a position resulting from a movement through about 180°.

* * * * *